(12) United States Patent
Blanchard

(10) Patent No.: X8099
(45) Date of Patent: Mar. 20, 1834

(54) PLANKING VESSELS

(76) Inventor: Thomas Blanchard

Thomas Blanchard of the City and State of New York –

Letters Patent

The schedule referred to in these Letters Patent and making part of the same containing a description in the words of the said Thomas Blanchard himself of his improvement in the art of fastening together, the planks or boards of a vessels or boats bottom sides, or deck To all to whom these presents shall come Be it known, that I Thomas Blanchard of the County of New-York and State of New York, have invented a new and useful Improvement, in the Art of fastening together the planks, or boards, of a vessels or boats bottom, sides, or deck and that the following is a full and exact description of the improvement I lay a keel of proper length and size correspon-ding to the boat intended to be made, with a stem and stern piece rabitted in a proper manner to receive the planking. On the upper side of this keel at suitable distances apart, I place rods or metalic bars which I bend to a proper curve varying their curvature, according to the shape and form of the boat, I intend to build, The centres of the curve, of these rods and bars, are made fast to the keel with their ends extending upwards, as high or a little higher than the gunwale of the boat. These rods may vary in number & size and distance apart according to the size of the Boat required These rods are made fast to the keel of the boat, by a keelson timber, extending over all the rods and made fast to that part of the rods, that rests on the keel by screws or nails holding them firmly upon the keel. The upper ends of these rods, are slightly attached to a spiling, [illegible] from stem to stern, forming the curve of the gunwale of the boat and which serves for the pur-pose of steadying and keeping them in their proper place while planking the boat, thus forming the skeleton of the boat, similar to the ordinary way of boat-building, The planks are cut to the length, width, and shape, as in the ordinary way of planking except that their edges are cut to such a bevel, or angle as will form a perfect joint and are placed against the outside of said rods, The rods may be partly bedded into them or only rest against them over said rods, and near each edge of the plank may be fixed; a clamp, or bracket, which may be a piece of hoop iron, or other metal, bent curving over the rods with each end fitting to the plank, with sufficient bearing to ad-mit of one or more holes in each end for the purpose of inserting nails or screws, which hold them firmly to the plank, but not so close as to prevent the planks from setting together to form a perfect joint These brackets, or, clamps must be fixed to all the plank wherever the rods cross them, Thus all the plank may be fastened to the rods except the wale-plank, which are the uppermost, and which form the Gunwale of said boat, into which the row-locks are fixed, These planks instead of being fastened by brackets are made at least one third thicker than the other planks and have holes bored through them of a proper size to receive the end of each rod on which is cut a male screw, These rods must pass through the end extending above the Gunwale timbers sufficiently by far to receive a nut and washer on the ends of each, and every rod and by screwing down upon all of them, each and every plank is brought to a perfect joint and the whole boat rendered firm and stiff, A small dowel pin should be inserted into the centre of the planks at their joints betwixt the rods, to prevent their slipping by each other, The [illegible] of the whole plank last mentioned that come in contact with the stem, and stem timbers must not be firmly fastened to
them, till the plank are all brought to their proper joint as
above described, after which they may be fastened with
sercio bolts or otherwise, The Thwarts or cross timbers of the
boat are placed at the usual height above the floor for a
seat or bench to be placed on them, the ends of these tim-
bers are cut to an angle that will fit the inside of the
plank and are butted against them resting on a cleat
under them, which is made fast to the plank and extending
inside nearly the whole length of the boat, crossing all of
the rods which are bedded into them and the cleats.
firmly fastened to one of the plank on each side running
nearly or quite their whole length in the under side of
said thwarts or cross timbers, a groove is cut large enough to
admit a small rod, which extends the whole length of
the thwarts, and through the sides of the boat above
the water line, are brought and held firmly against the
buts of the thwarts above described, Thus all the cross timbers
are firmly born against the sides of the boat which keeps
the boat from spreading, while at the same time it forms
a foundation for all the seats, A Stanchion is fixed in
an upright position, the downward end resting on, or
tenoned in the described keelson, the upper ends bearing
against the under sides of the thwarts, near their centre
which will prevent them from setting down, Diagonal
braces may be fixed, when useful, one end of which may
rest against the thwarts, near their centre, and extending
at their downward ends and coming in contact with
the sides of the boat, about half the distance from the
floor to the ends of the thwarts and made fast to a short
cleat extending only over the two nearest rods at the
ends of the braces above described, these diagonal braces
will serve to keep the boat from working and preserve it stiff and firm, that I have described the method of applying
my mode of fastening together ordinary skiffs, whale
boats, and pleasure boats &c. I will now describe the
manner of forming a deck by the mode of fastening and
attaching it to a boat as above described.
Rods of sufficient length to reach from one
gunwale to the another are passed through them a sufficient
distance to admit of a screw, nut and washer outside of
the gunwale, these rods are bent to a curve or crowning
corresponding to the curve or crown of the deck, and
put at convenient distances apart the whole length of
the boat, The deck boards or plank are cut to the
width, length and shape required for ordinary boats placed
on the upper side of said deck rods, and fastened to them
by brackets in the same manner as the sides of the boat
are fastened as above described and by the same method
brought to a perfect joint that is by the screws on each
end of the rods, outside being drawn up tile every plank
of the deck is brought so close as will render it im-
pervious, to water, while at the same time the screws
that pass through the gunwale before described, hold
the deck down and bring the underside of the gunwale
timber to a joint with the sides of the boat, To render
the deck capable of sustaining the necessary weight
I fix stanchions to the keelson as above described with
their upper ends rising to a timber which runs horizontally
under the whole length of the decks, on which the deck
rods rest, which prevents the deck from settling down
To prevent the sides of the boat from spreading by
the pressure upon the deck, rods are fixed under the deck
at suitable distances apart passing through each gunwale
in a straight line from one gunwale to another, These
rods being in a straight line and not crowning like the rods of the deck on which the deck planks are fastened will when brought to a proper tension by the screws outside of the gunwale, rather serve to raise the deck still more crowning, and prevent the pressure on the deck from spreading the sides of the boat apart, knees may be fixed under the deck at suitable distances, after the sides and deck are brought to their proper bearings; by the method above described, carlings or timbers may be also placed under the deck made fast at each end to the gunwale and rests on cleets bolted or fastened to the sides of the boat for the purpose of sustaining the deck, where great strength is required, boats of great length may be built with their sides rising higher towards midships, than the Bow and Stern, which serve to stiffen them, and prevent their hogging, their sides above the water line may rise perpendicularly and be decked over, Crosstimbers should be placed at suitable distances below the deck to serve as braces, with rods grooved into them passing through the sides of the boat, & with screws outside of the boats will bring the sides of the boat against the ends of the crosstimbers to hold the sides firm, and prevent them from spreading When two boats are connected together for a steam boat for instance, above the gunwales of each boat, carlings or beams may extend across both boats extending over the outside of each boat, sufficiently far for the guards of the boat. these beams may be fastened to each boat by the rods that form the ribs of the boat extending above the gunwales of the boats high enough to pass through said beams and by screwing them fast to the gunwales of both boats, Both boats may be connected together and a deck formed above them covering both boats, and the space between them on which cabins may be erected, It may be however more convenient to have separate rods, or bolts passing through the deck beams, and through the gunwales of the boats, than to increase the length of the rods or ribs of the boat for that purpose, This mode of fastening may be applied to [illegible] long boats. and boats made sharp at both ends, without a keel or stem and sterntimbers, in the ordinary way, which is done by diminishing the circle or curvature of the body towards the ends of the boats, to a small compass, and also covering the plank narrower towards the ends in the same proportion, by which means, a boat may be brought almost to a point. By this mode of fastening the plank may be made much thinner than in the ordinary mode of fastening there being no necessity for caulking, The screws that hold on the brackets should not go through for they will interfere with the dressing of the outside of the boat, and forming a smooth surface, In making very small boats with thin sides or planking, too thin to fasten the brackets with wood, screws, wrought iron or copper nails, may be substituted with proper clinches, outside of the planking, which may be dressed down smooth, and made level with the outside sur-face of the boat, Stiffenings such as knees, futtocks and other kinds of frame work may be put into boats or vessels, having this method of fastening, after the fastenings are pro-perly made, and the planking brought to a proper point for the purpose of greater solidity, but which I do not claim as my improvement, Instead of round rods, wide flat bars may be used bent to the curve of the boat edgewise which will serve to stiffen the boat more than round rods or flat bars bent flatwise, when extreme long bars are necessary they may be put in in several pieces and bolted or rivetted together, or the lower ends of them may be made fast in the keel with heads or screws, which might in some cases be more convenient, or round rods may be passed through the centre of the plank, and supercede the necessity of brackets, instead of cutting a male screw on the end of the rods or bars, the ends may be made with a socket or bent at right angle and a female screw made in them and a bolt with a head on one end, and the other passed through the beams or gunwales, having a male screw cut, to enter the female screw
just mentioned. This arrangement would prevent the necessity
of having the thread of the screw outside of the vessel and exposed
to the salt water which would be likely to waste or corrode them
Flat bars may also be put outside of the planking, and bolted
into them and screws attached to their ends in the same manner
as those inside which would add a greater degree of solidity to
the work. The principle of this invention, is to be found in
the mode of joining together planks or boards of a ship's, or vessels
or boats bottom, in the form or curvature intended and also the
decks of vessels, and fastening them so as to form the hulls or bot-
tom, or deck of vessels or boats with less material and yet
of equal strength, in comparison with vessels or boats of or-
-dinary construction. This mode is cutting the edges of
the planks, or boards, and fitting them together according to
the form intended with, or without dowels or tongues or groves
so that when the plank or boards are placed in their proper
position and the edges thus cut are pressed together by
a mechanical power acting with sufficient force, and these
planks or boards are by suitable mechanical means, drawn
or forced inwards at the same time, and kept firmly in the
intended form or curvature by such mechanical power, and
by suitable cross braces corresponding with the form, or curva-
-ture intended. The edges of said planks or boards will
form permanent close joints. The mechanical force and
means used being so constructed substantially as afore-
-said, that the action of said force and means will be
simultaneous on the edges to press them together, and on
the planks or boards to draw and force them inwards. The
brackets applied to the inner side of the planks or boards, and
iron rods, with screws extending from gunwale to gunwale
where no keel or kelson is laid or from the keel or kelson
where there is one, and the braces or cross beams placed with
[illegible]

and extending from side to side according to the form or curvature, intended as above described are the mechani-cal means deemed most expedient by the applicant, Yet there are divers mechanical means which may be used instead of these in part, as for example, keys instead of screws, and also wedges might be used to force and press the edges of the plank or boards inwards, so that after pressing the edges of the plank or boards together. these may be se-cured by any common fastening to the frame floor timbers futtocks, or ribs of a vessel or boat or the plank or boards may be bored through from edge to edge, so that the rod may pass through them and this may be relied upon instead of the bracket, or rings or staples may be used instead thereof, and so chains may be used instead of rods, and elastic wood even substituted for the rods in small constructions But the principle of this improvement consists in the simul-taneous action, and continued force of Mechanical means upon the edges of the planks or boards of a ships, or vessels, or boats, bottom and sides, and decks as aforesaid, the edges of said plank or boards, being cut according to the form or curvature intended, so that the mechanical force used, will act fairly & equally on the surface of said edges, and on the planks and boards to press the edges closely together, and draw the planks or boards inwards by the same operation, substantially in the mode herein first above described, in respect to the fastening of the bottoms, and sides and decks of vessels respectively.

Witnesses
Jas C. Bayler [illegible]
James Bowdoin

Thomas Blanchard

Fx d.
[illegible]